Figure 1:
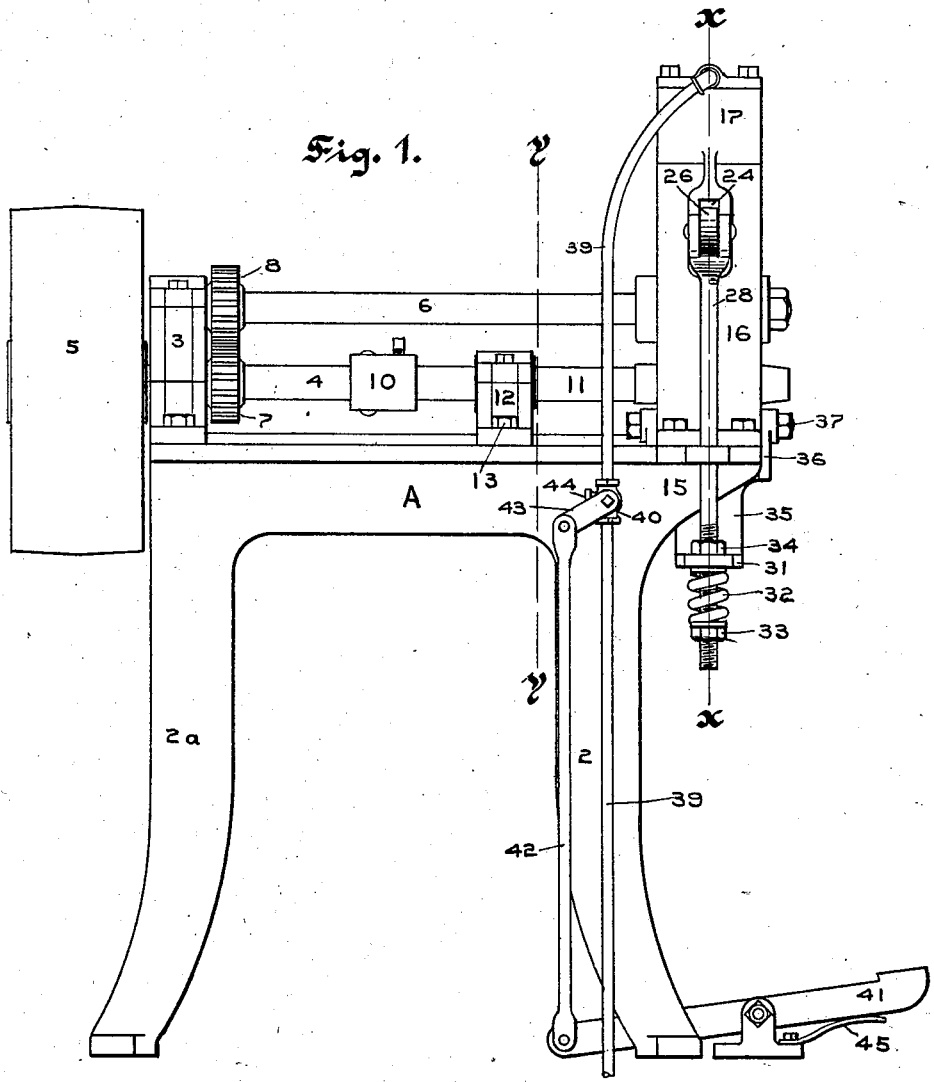

No. 724,561. PATENTED APR. 7, 1903.
H. A. FERGUSSON.
TUBE WELDING MACHINE.
APPLICATION FILED OCT. 30, 1902.
NO MODEL. 4 SHEETS—SHEET 1.

Witnesses,
W. H. Palmer
Emily F. Otis

Inventor,
Henry A. Fergusson.
by Lothrop & Johnson
his Attorneys.

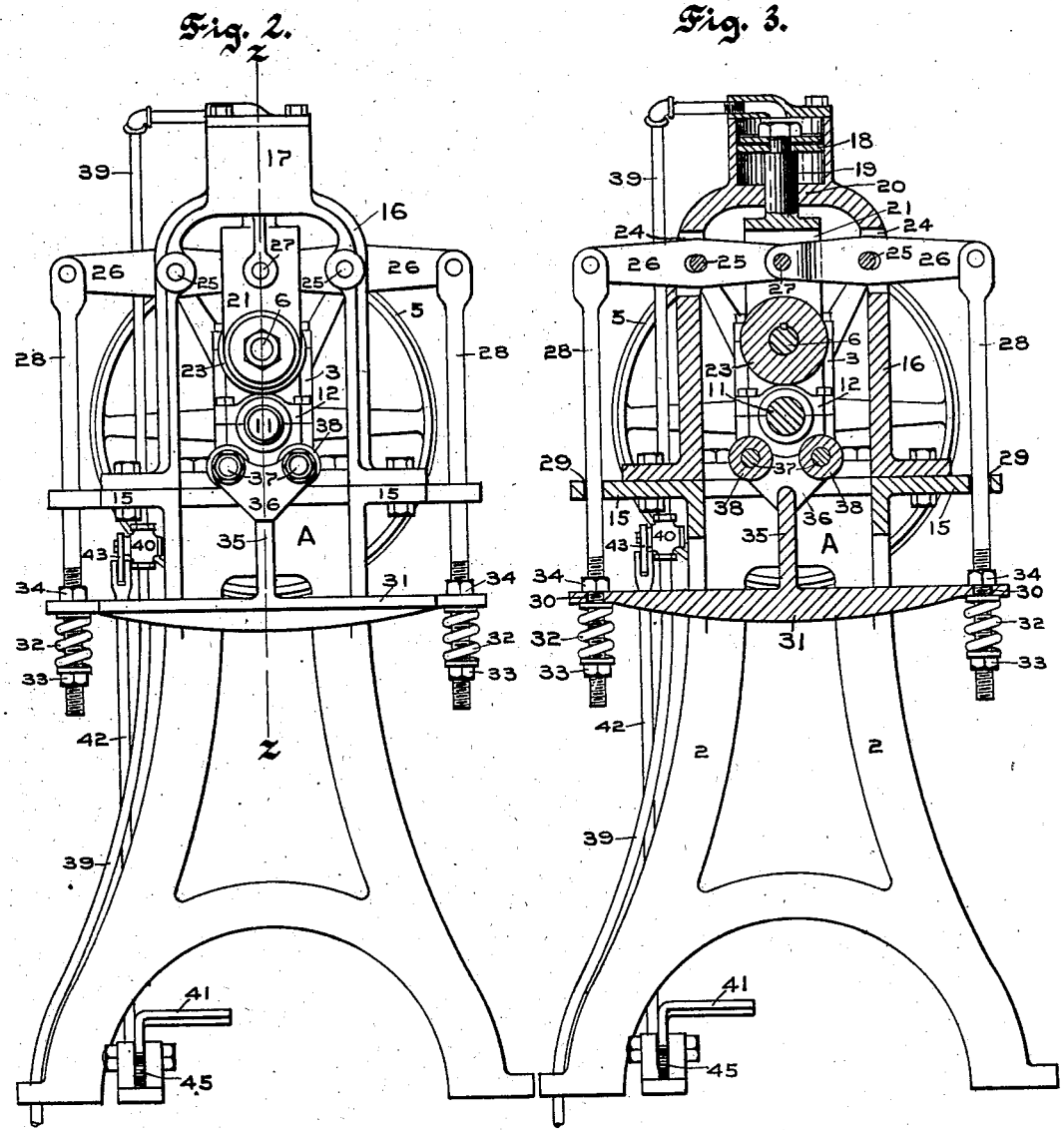

No. 724,561. PATENTED APR. 7, 1903.
H. A. FERGUSSON.
TUBE WELDING MACHINE.
APPLICATION FILED OCT. 30, 1902.
NO MODEL. 4 SHEETS—SHEET 3.
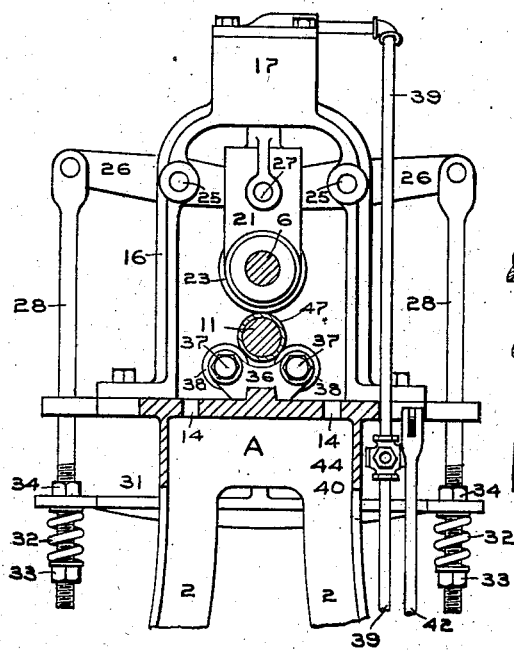
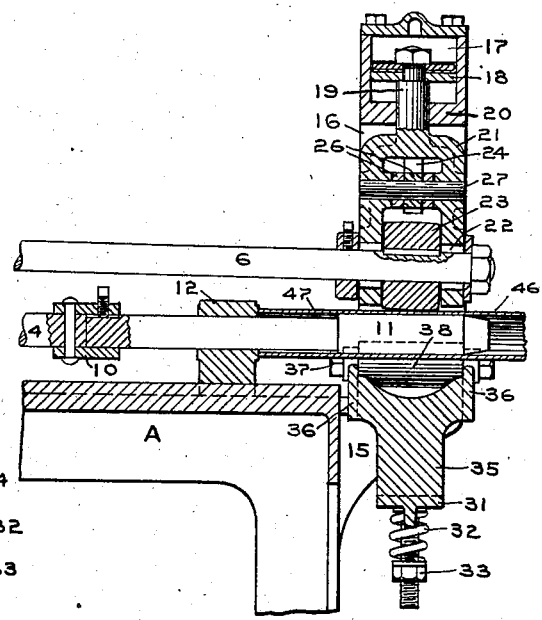
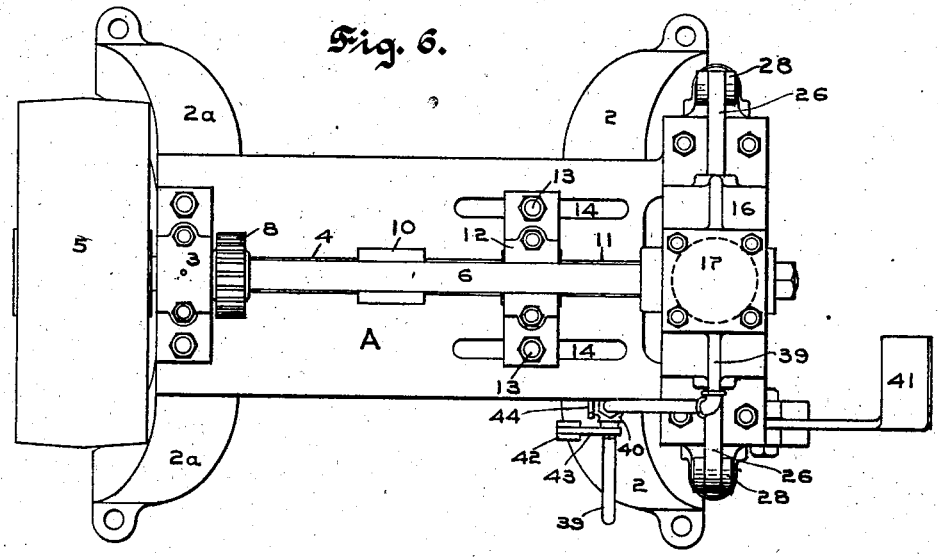
Witnesses,
W. H. Palmer
Emily F. Otis
Inventor,
Henry A. Fergusson.
by Lothrop & Johnson
his Attorneys.

No. 724,561. PATENTED APR. 7, 1903.
H. A. FERGUSSON.
TUBE WELDING MACHINE.
APPLICATION FILED OCT. 30, 1902.
NO MODEL. 4 SHEETS—SHEET 4.
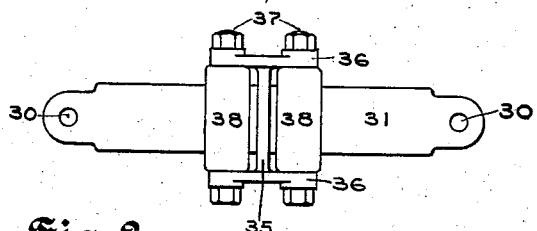
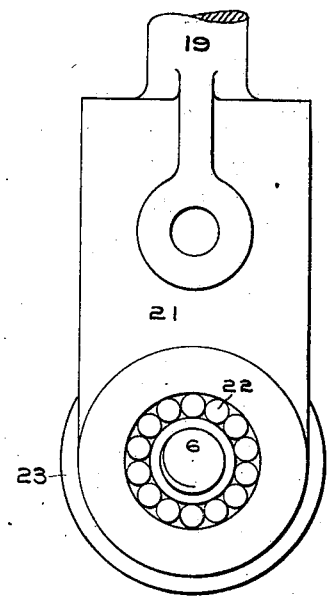
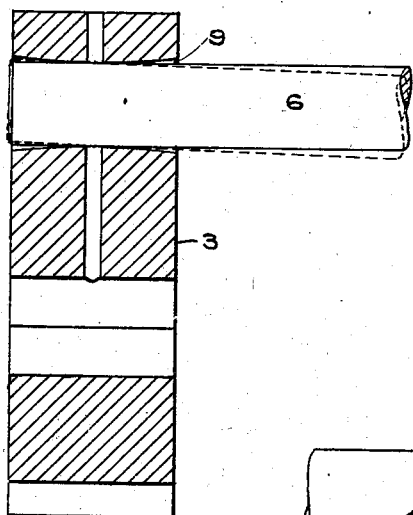
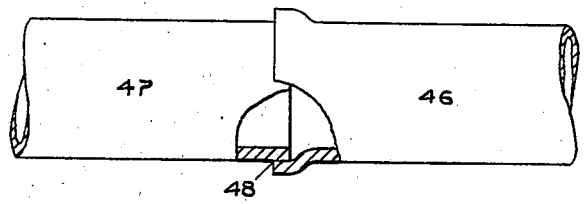
Witnesses,
W. H. Palmer.
Emily F. Otis.
Inventor,
Henry A. Fergusson.
by Lothrop & Johnson
his Attorneys.

UNITED STATES PATENT OFFICE.

HENRY A. FERGUSSON, OF ST. PAUL, MINNESOTA.

TUBE-WELDING MACHINE.

SPECIFICATION forming part of Letters Patent No. 724,561, dated April 7, 1903.

Application filed October 30, 1902. Serial No. 129,347. (No model.)

*To all whom it may concern:*

Be it known that I, HENRY A. FERGUSSON, a citizen of the United States, residing at St. Paul, in the county of Ramsey and State of Minnesota, have invented certain new and useful Improvements in Tube-Welding Machines, of which the following is a specification.

My invention relates to improvements in tube-welding machines, and has for its object to provide a machine for welding together tube-sections under great pressure and making a weld of great strength and of uniform gage with the rest of the tube and whereby the welding may be accomplished very perfectly, expeditiously, and economically.

To this end my invention consists in the construction, combination, and arrangement of parts hereinafter described, and particularly pointed out in the claims.

In the accompanying drawings, forming part of this specification, Figure 1 is a side elevation of my improved machine, showing the rolls in normal position when not under pressure. Fig. 2 is a front elevation of the same. Fig. 3 is a section on line *x x* of Fig. 1. Fig. 4 is a section on line *y y* of Fig. 1, showing the welding-rolls in welding position with a welded tube in place between them. Fig. 5 is a section on line *z z* of Fig. 2, but showing the parts in the same position as in Fig. 4 with a welded tube in place between them. Fig. 6 is a plan view of the machine. Fig. 7 is a detail showing in plan the lower welding-rolls and their supporting-frame. Fig. 8 is a front view of the bifurcated frame for the upper welding-roll with some of the parts removed. Fig. 9 is a vertical longitudinal section of the pillow-block in which the upper-roll shaft and mandrel-shaft are journaled, and Fig. 10 illustrates the way in which the tubes may be lapped before welding.

Referring to the drawings, A represents the bed-plate of the machine, supported upon the legs 2 and 2$^a$. Journaled in the pillow-block 3 at the rear end of the bed-plate is a mandrel-shaft 4, driven from any suitable source of power through the medium of the drive-pulley 5, carried by the mandrel-shaft. Also journaled in the pillow-block 3 and arranged substantially parallel with the mandrel-shaft is an upper-roll shaft 6, driven by the mandrel-shaft through the medium of intermeshing gears 7 and 8 upon the mandrel-shaft and upper-roll shaft, respectively. The diameter of the bearing 9 of the upper-roll shaft in the pillow-block 3 increases slightly from its center to each end, so as to permit of a slight angular movement in the upper-roll shaft, as shown in dotted lines in Fig. 9. Coupled to the forward end of the mandrel-shaft by a coupling 10 is a mandrel 11, having a bearing in the pillow-block 12, which is secured to the bed-plate and adjustable longitudinally thereon by bolts 13, passing through slots 14 in the bed-plate. The mandrel is enlarged in diameter at its forward end to fit the tube-section to be welded. The pillow-block 12 is made adjustable along the mandrel in order that it may be adjusted to the length of the tube-section to be welded.

The forward end of the bed-plate A terminates in brackets 15, extending beyond the legs 2. To these brackets is secured a frame 16, carrying at the top a cylinder 17. Working within the cylinder is a piston 18, having a piston-rod 19 extending down through the lower cylinder-head 20 and terminating in a bifurcated cross-head or housing 21. The forward or working end of the roll-shaft 6 is journaled in roller-bearings 22 in the sides of the housing 21 and upon it is fixedly mounted between the sides of the housing the upper welding-roller 23.

Extending through openings 24 in the opposite sides of the frame 16 and loosely pivoted therein by pivots 25 are two levers 26. The inner ends of these levers have pivotal connection 27 with each other and with the sides of the housing 21, and their outer ends are pivotally connected with rods 28, extending downwardly through guide-holes 29 in the brackets 15. The lower portions of the rods are threaded and pass through holes 30 in the lower-roll-carrying plate 31, which extends across and in front of the bed-plate beneath the brackets 15. This plate is elastically supported upon the rods 28 by helical springs 32, resting upon nuts 33 upon the rods 28 and is held down against the springs by nuts 34, also on the rods 28. The pressure of the springs may be regulated and the plate adjusted in height by means of the nuts 33 and 34. Extending upwardly from the middle of the plate 31 is a web 35, carrying at front and rear transverse flanges 36, connected by parallel bolts or pins 37, preferably two in number and spaced apart, upon which are rotatably mounted the lower supporting-rollers 38, arranged below the mandrel and parallel with it.

The piston 18 is actuated to depress the upper welding-roller 23 and its housing 21 and through the mechanism just described to raise the lower supporting-rollers 38 by compressed air or other fluid supplied through the pipe 39, which leads from any suitable source of supply to the upper part of the cylinder 17 above the piston. The supply of fluid, preferably compressed air because of its elasticity, is controlled by an ordinary three-way valve 40, operated by the foot of the machine operator by means of the treadle 41, rod 42, and lever 43. The valve has an outlet 44 open to the atmosphere. The treadle may be provided with a spring 45 to assist in causing the valve-operating mechanism to return to its normal position, as shown in Fig. 1, after the treadle has been released. In this position the cylinder and the portion of the pipe above the valve are cut off from communication with the portion of the pipe below the valve, but are open to communication with the atmosphere through the valve-outlet 44.

The great pressure attainable in my machine makes it possible to weld the tube-sections with overlapping unscarfed ends, as illustrated in Fig. 10, whereby the welding-joint is at right angles with the line of application of the power and a weld of much greater strength is secured than would be possible if the tube ends had to be scarfed and the joint made diagonal.

As shown in Fig. 10, the tube-sections are prepared for welding by belling out the end of one section 46 sufficiently to allow the end of the other section 47 to be inserted therein a short distance to form a lap or joint 48 substantially parallel with the axis of the tube. With a joint of this kind it is possible to reduce the lap to a length hardly greater than the thickness of the tube-walls. The reduction of the lap not only saves material, but insures more perfect welding in this machine. The joint is then heated to welding temperature and the tube-sections are slipped over the mandrel until the end of the shorter section abuts against the face of the pillow-block 12, which has been previously adjusted so that the joint will be brought directly beneath the center of the welding-roller 23. The tube-sections resting upon the mandrel will at once be carried around with it. The treadle is then depressed to operate the valve 40 to establish communication between the upper part of the cylinder 17 and the source of compressed-air supply. The pressure of the air entering the cylinder forces down the piston 18, and with it the cross-head or housing 21, carrying the rotating upper roller 23 down against the tube. As this roller is larger in diameter than the mandrel, and therefore has a greater peripheral velocity, it will turn the tube-sections around the mandrel with greater speed than the mandrel itself, and the mandrel will exert a wiping effect on the inside of the tube to wipe the weld smooth. The cross-head 21 in its descent at the same time depresses the inner ends of the levers 26, thereby raising the outer ends of these levers, and with them the rods 28 and plate 31, and carrying the lower rollers 38 up against the under side of the tube-joint, these rollers having been previously adjusted so as not quite to touch the tube when the upper roll 23 first touches the joint to be welded. The purpose of this adjustment is to enable the upper or active roller to act upon the joint and exert its rotative effect thereon a little in advance of the engagement of the lower or passive rollers therewith. It will be seen that the pressure of the active roller 23 upon the tube-joint is thus applied around the entire circumference of the joint, compressing the overlapping ends of the tube-sections into one practically homogeneous tube-wall of the same thickness as the rest of the tube. This result is accomplished not only by the great pressure exerted upon the joint, but by having the lower rollers 38 of considerably greater length than the upper roller or the heated portion of the tube-sections, so that the ends of the rollers will press against the cooler metal, which will not yield to their pressure, thus preventing the welded portion from being made thinner than the rest of the tube. The lower supporting-rollers 38, which are moved upward against the under side of the tube by the same mechanism which forces the upper welding-roller 23 down against the upper side of the tube, relieve the mandrel of the strain to which it would otherwise be subjected by the downward pressure of the roller 23 and make possible the use of much greater pressure than the mandrel alone would support, and by elastically supporting the lower-roll-carrying plate 31 upon the springs 32 I am enabled to avoid the strain upon the roll-carrying members and the bending or breaking of parts, which might otherwise result from an inexact adjustment of the rollers with reference to the mandrel. When the welding is completed, the treadle 41 is released to allow the valve 40 and its operating mechanism to return by the weight of the parts or under the action of the spring 45 to their normal position, as shown in Fig. 1, cutting off the supply and establishing communication between the cylinder and atmosphere through the outlet 44. The pressure is thus released from the top of the piston and the roll-carrying parts allowed to return to their normal position, (shown in Figs. 2 and 3), the weight of these parts being preferably so distributed as to accomplish this without the use of other means.

My improved machine is particularly useful in welding boiler-flues, but is adapted for use generally in welding together tube-sections, welding collars upon tubes, and the like.

I do not limit myself to the exact mechanism shown and described, for the same may be modified in detail without departing from the principle of my invention, the scope of which is defined in the claims.

Having now described my invention, what I claim as new, and desire to secure by Letters Patent, is—

1. A tube-welding machine, comprising, in combination, a mandrel, a housing adjacent thereto, an active welding-roller having journal-support in said housing upon one side of the mandrel, means for rotating said roller and means for moving the housing toward and away from the mandrel, and passive supporting-rollers arranged upon the opposite side of the mandrel and operatively connected with said housing so as to be movable therewith, but in an opposite direction.

2. A tube-welding machine, comprising, in combination, a mandrel, an active rotatably-supported welding-roller upon one side of the mandrel, means for rotating said roller and means for moving said roller toward and away from the mandrel, elastically-supported passive rollers upon the opposite side of the mandrel, and lever connection between the active and passive rollers whereby the passive rollers are carried toward and away from the mandrel in unison with the active roller.

3. A tube-welding machine, comprising, in combination, a mandrel, a housing adjacent thereto, a welding-roller having journal-support in said housing upon one side of the mandrel, means for rotating said roller, a pair of suitably-supported levers pivotally connected with said housing, a pair of supporting-rollers pivotally supported by said levers upon the opposite side of the mandrel, and means for depressing and raising said housing whereby the welding-roller and the supporting-rollers are moved in unison, but in opposite directions, toward and away from the mandrel.

4. A tube-welding machine, comprising, in combination, a mandrel, a housing adjacent thereto, a roll-shaft journaled at its inner end in suitable bearings and at its outer end in said housing, a welding-roller carried by said shaft near its outer end upon one side of the mandrel, supporting-rollers arranged upon the opposite side of the mandrel, lever connection between said housing and supporting-rollers, and means for moving said housing and the therewith-connected welding and supporting rollers toward and away from the mandrel.

5. A tube-welding machine, comprising, in combination, a mandrel, a housing adjacent thereto, a roll-shaft journaled at its inner end in suitable bearings and at its outer end in said housing, a welding-roller carried by said shaft near its outer end upon one side of the mandrel, a pair of suitably-supported levers pivotally connected with said housing, supporting-rollers pivotally supported by said levers upon the opposite side of the mandrel, and means for depressing said housing whereby the welding and supporting rollers are moved in unison toward the mandrel.

6. A tube-welding machine, comprising, in combination, a mandrel, a housing adjacent thereto, a welding-roller having journal-support in said housing, a pair of levers suitably fulcrumed between their ends, the inner ends of the levers being pivotally connected with said housing, supporting-rollers elastically supported from the outer ends of the levers and positioned upon the opposite side of the mandrel, means for rotating said welding-roller, and means for depressing and raising said housing whereby the welding and supporting rollers are moved in unison toward and away from the mandrel.

7. A tube-welding machine, comprising, in combination, a mandrel adapted for insertion into a tube-section to be welded, a swinging shaft, a welding-roller carried by said shaft upon one side of the mandrel, supporting-rollers rotatably mounted upon fixed pins on the other side of the mandrel, and commonly-actuated means for moving all of said rollers toward and away from the mandrel.

8. A tube-welding machine, comprising, in combination, a mandrel adapted for insertion into a tube-section to be welded, a swinging roll-shaft upon one side of the mandrel and a roller carried by the shaft, elastically-mounted rollers upon the other side of the mandrel, and means to move all of said rollers in unison against the tube-section to be welded.

9. A tube-welding machine, comprising, in combination, a mandrel adapted for insertion into a tube-section to be welded, a swinging shaft, a welding-roller carried by the shaft upon one side of the mandrel, oppositely-disposed rollers arranged upon the other side of the mandrel, means to rotate the swinging shaft, and pneumatic means for moving all of said rollers toward the tube-section to be welded and into pressing engagement therewith.

10. A tube-welding machine, comprising, in combination, a rotatable mandrel adapted for insertion into a tube-section to be welded, a swinging shaft and a welding-roller carried by the shaft upon one side of the mandrel, said roller being larger in diameter than the mandrel, oppositely-disposed rollers arranged upon the other side of the mandrel, means to rotate the swinging shaft, and means for moving all of said rollers in unison toward a tube-section to be welded, and into pressing engagement therewith.

11. A tube-welding machine, comprising, in combination, a rotatable mandrel adapted for insertion into a tube-section to be welded, a swinging shaft and means to rotate the same, a welding-roller carried by said shaft upon one side of the mandrel, said roller being larger in diameter than the mandrel, oppositely-disposed rollers elastically supported at the other side of the mandrel, means to rotate the swinging shaft, and means for moving all of said rollers in unison against the periphery of the tube-section to be welded.

12. A tube-welding machine, comprising, in combination, a mandrel, an active welding-roller arranged on one side of the mandrel, passive rollers arranged on the other side of the mandrel, the passive rollers being of greater length than the active roller for the purpose specified, and commonly-actuated means for moving all of said rollers toward the mandrel.

13. A tube-welding machine, comprising, in combination, a mandrel adapted for insertion within a tube to be welded, an active welding-roller disposed on one side of the mandrel, passive rollers disposed on the other side of the mandrel, the passive rollers being of greater length than the heated portion of the tube to be welded, and interconnected means for moving all of said rollers toward the tube and into pressing engagement therewith.

14. A tube-welding machine, comprising, in combination, a mandrel, a housing adjacent thereto, a roll-shaft swingingly journaled in suitable bearings at its inner end and also journaled at its outer end in the sides of said housing, a welding-roller carried by said shaft at its outer end, and above the mandrel, a frame about the mandrel and housing, a pair of levers pivotally supported in the opposite sides of the frame, the inner ends of the levers being pivotally connected with each other and with the housing, a support suspended from the outer ends of the levers, rollers carried by said support below the mandrel, and means for thrusting said housing downwardly, whereby the upper roller is moved down and the lower rollers are simultaneously moved up.

In testimony whereof I affix my signature in presence of two witnesses.

HENRY A. FERGUSSON.

Witnesses:
A. E. HARN,
ARTHUR P. LOTHROP.